Nov. 30, 1965
L. H. GALLAGHER
3,220,417
DATA PROCESSING
Filed Feb. 15, 1960
9 Sheets-Sheet 1
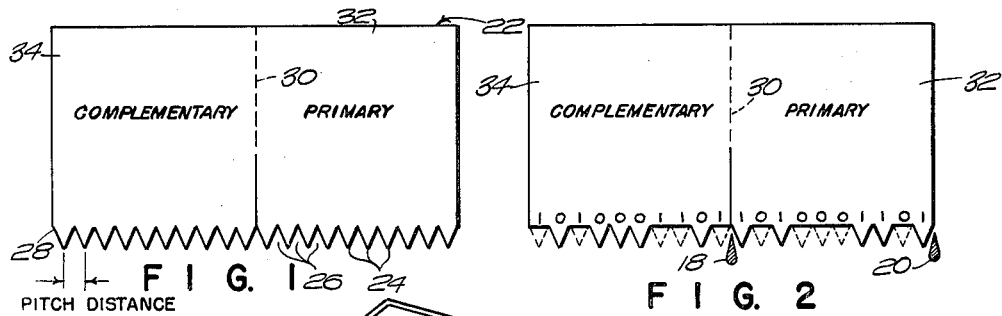
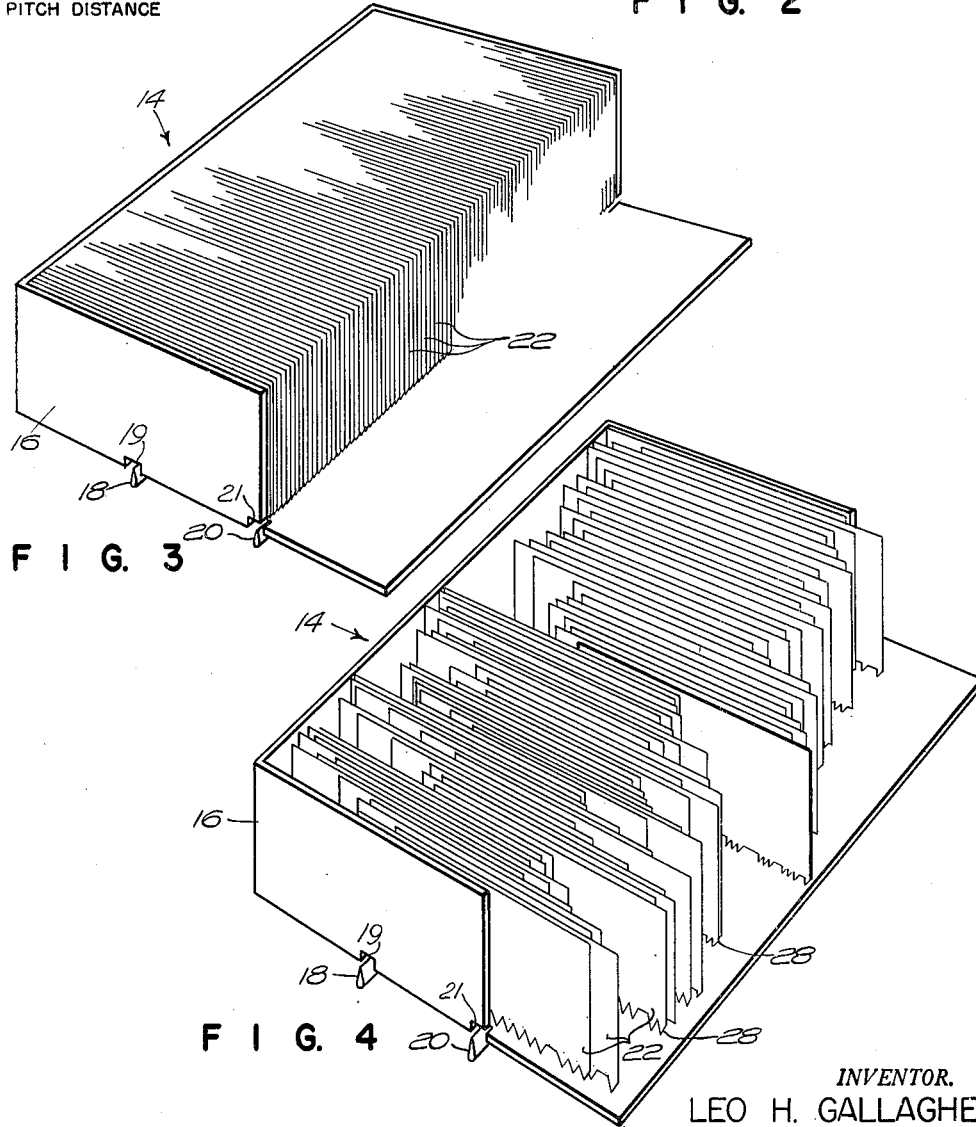
INVENTOR.
LEO H. GALLAGHER
BY
Joseph Weingarten
ATTORNEY INVENTOR.
LEO H. GALLAGHER
BY
Joseph Weingarten
ATTORNEY

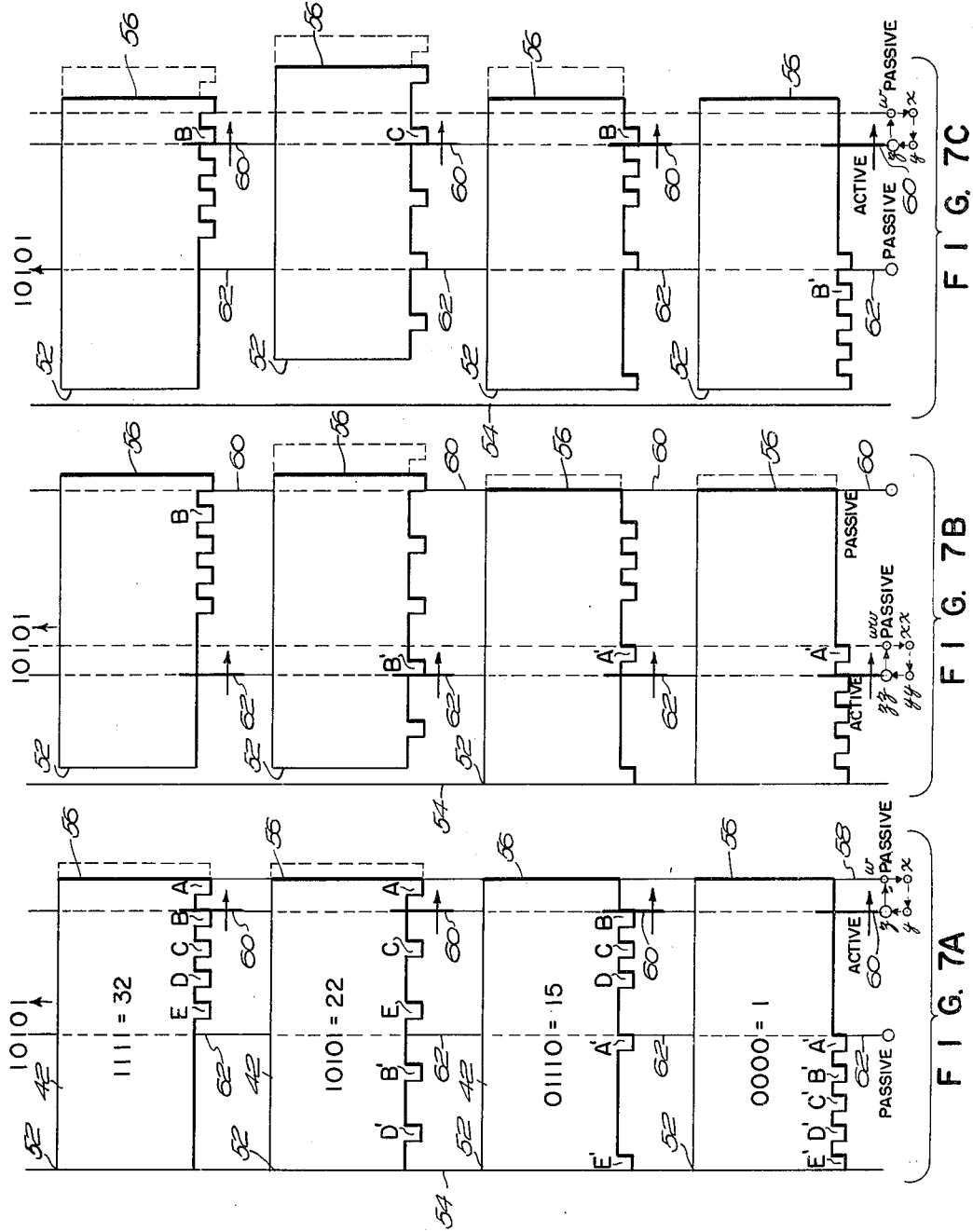

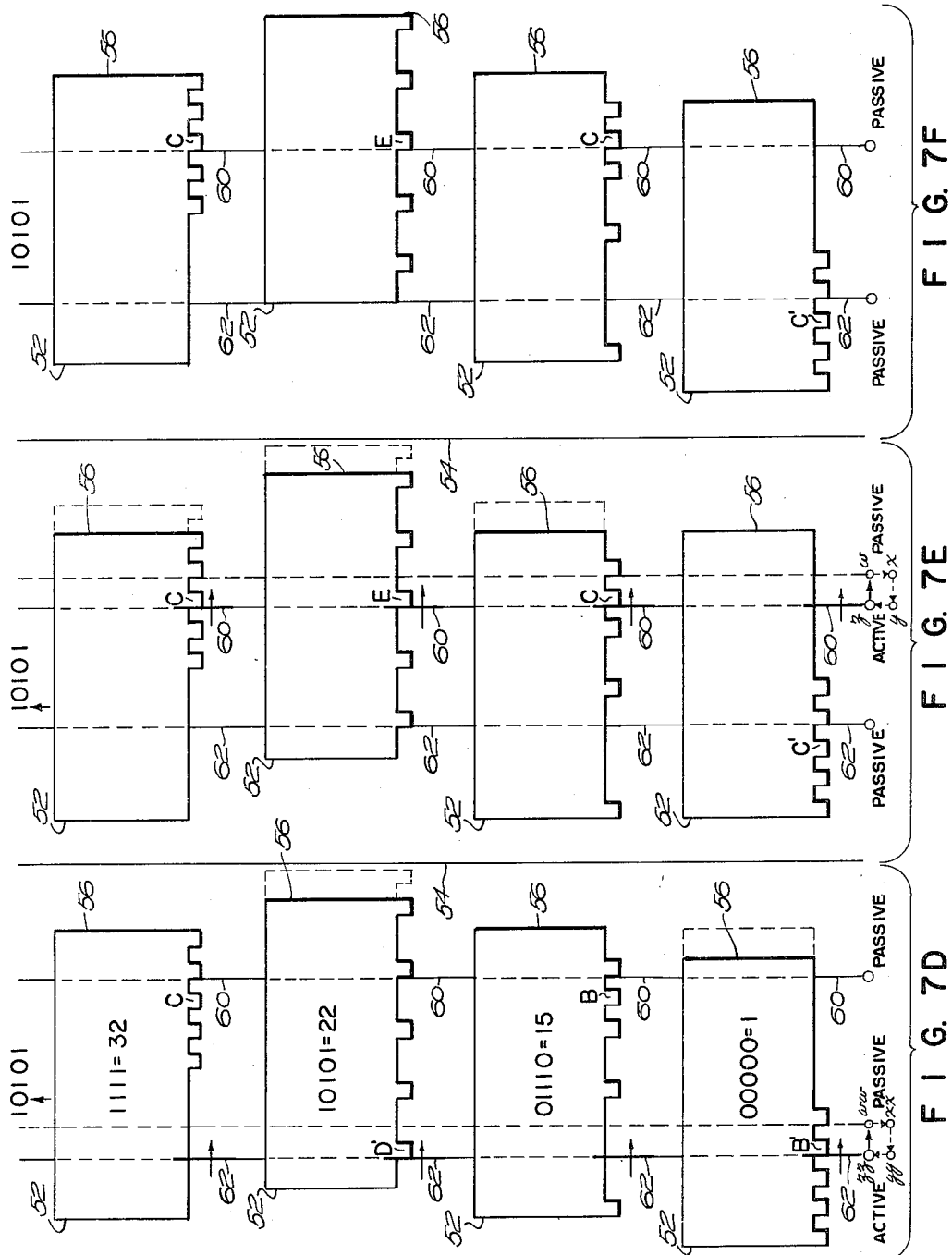

Nov. 30, 1965 L. H. GALLAGHER 3,220,417
DATA PROCESSING
Filed Feb. 15, 1960 9 Sheets-Sheet 5
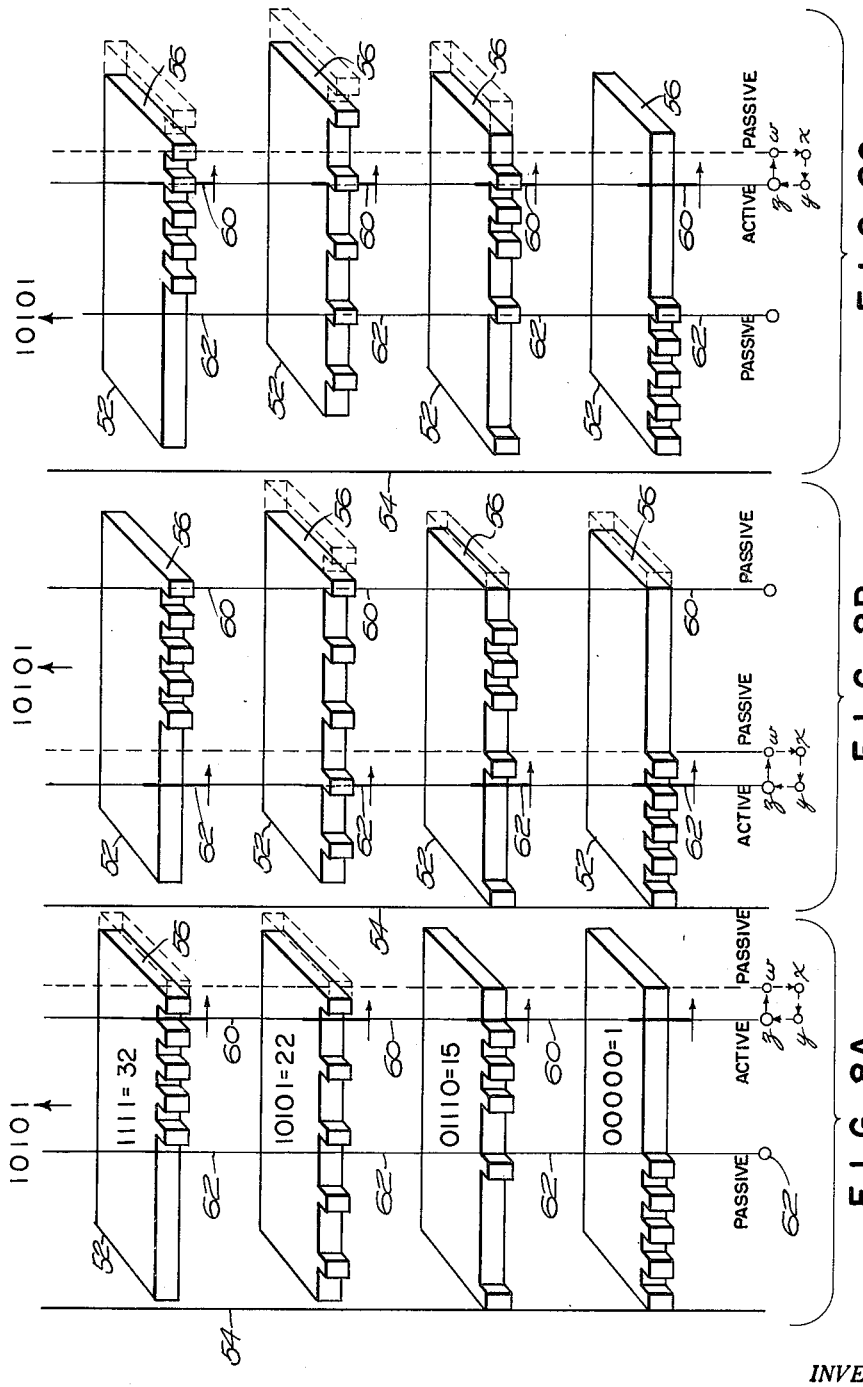
INVENTOR.
LEO H. GALLAGHER
BY
Joseph Weingarten
ATTORNEY Nov. 30, 1965  L. H. GALLAGHER  3,220,417
DATA PROCESSING
Filed Feb. 15, 1960  9 Sheets-Sheet 6

INVENTOR.
LEO H. GALLAGHER
BY
ATTORNEY

Nov. 30, 1965   L. H. GALLAGHER   3,220,417
DATA PROCESSING

Filed Feb. 15, 1960   9 Sheets-Sheet 7

INVENTOR.
LEO H. GALLAGHER
BY
*Joseph Weingarten*
ATTORNEY

Nov. 30, 1965 L. H. GALLAGHER 3,220,417
DATA PROCESSING
Filed Feb. 15, 1960 9 Sheets-Sheet 8

1101000 1101 = #1587

INVENTOR.
LEO H. GALLAGHER
BY
*Joseph Weingarten*
ATTORNEY

Nov. 30, 1965   L. H. GALLAGHER   3,220,417
DATA PROCESSING
Filed Feb. 15, 1960   9 Sheets-Sheet 9

INVENTOR.
LEO H. GALLAGHER
BY
ATTORNEY

'United States Patent Office 3,220,417
Patented Nov. 30, 1965

3,220,417
DATA PROCESSING
Leo H. Gallagher, Foxboro, Mass., assignor to Itek Corporation, Waltham, Mass., a corporation of Delaware
Filed Feb. 15, 1960, Ser. No. 8,646
1 Claim. (Cl. 129—16.1)

This invention generally concerns a method and apparatus for retrieving a desired item from a plurality thereof and more particularly relates to a logical access or retrieval method and apparatus for randomly stored, binary coded cards carrying data.

Conventional retrieval of information from a large store or library is not infrequently a cumbersome and time consuming venture. The success of research amongst catalogued data is as much as function of the fastidiousness and care taken in filing the data correctly, as it is a function of the thoroughness of the search. Classification or cataloging itself requires skilled personnel who should not be burdened with the routine of sorting and filing.

A system which would make catalogued material immediately accessible without depending upon previous elaborate filing procedures is clearly desirable; and, in fact, several indexing and library store systems have been developed for the automatic coding and retrieval of randomly stored intelligence. Generally, these involve information-bearing cards having identification and other data in the form of coded holes for machine sensing. Some machines employ film on which documents, photographs and comparable information may be recorded. These will frequently employed a cardboard support which bears both printed information and coded holes. I.B.M. cards, Filmsort and Keysort are all systems which are in use currently. Other schemes have coding for identification purposes in the form of magnetic or optically sensed areas on the face of the cards.

While these various systems perform reasonably well, a fundamental defect is common to nearly all of them. Because they all depend on a search-and-compare method of operation, as soon as the store size becomes large, the time required to retrieve one item becomes undesirably long. By the search-and-compare method at least one-half on the average, and at most, every card in the file must be inspected and compared with a predetermined accession number every time a particular information card is required. Besides being a lengthly procedure, it also means that the data-carrying surface of almost every card is subject to deterioration each time a store of cards is searched. Furthermore, such elaborate systems are not inexpensive.

It is an object of the invention, accordingly, to provide a retrieval method and an apparatus for coded data-carrying sheets of significantly shorter access time than systems presently available.

Another object of the invention is to provide rapid retrieval of randomly stored sheets.

An additional object of the invention is to provide a device in which accession time is relatively independent of library size.

A further object of the invention is to provide a device capable of dealing with data-carrying sheets of practically any size down to as small as 16 mm. width.

Still another object of the invention is to provide a rapid retrieval device wherein intelligence may be stored in various forms such as magnetic bits, photographs, printed intelligence (human readable), punched holes or insertions.

An additional object of the invention is to provide a mechanism which can be as simple or as automatic as any particular application requires.

A still further object of the invention is to provide a retrieval system capable of broad flexability in respect to the coding system used for access discrimination.

Another object of the invention is to provide a data storage and access system which is positive in operation whereby errors in conventional systems caused by friction, curling, bending, humidity changes, and deterioration are substantially minimized.

Basically, the invention involves rapid retrieval of a preselected item or items out of a large plurality of stored items. The items are physically comparable, but each has a unique access code arranged as a profile of an edge or surface segment in a simple binary form or a binary variant. This same code is repeated elsewhere on the item, generally immediately adjacent on the same edge or surface sector, but as the complement of the first code. In other words, if the code is 1001010, its appearance in the complementary form is 0110101. If in the first code segment, binary ONE is represented by an actual physical presence of something, for example, a ridge on a surface or a tab on an edge, binary ZERO would be represented by its absence. In the complementary code segment the situation is reversed such that binary ONE is represented by absence, binary ZERO by presence of the ridge or tab.

The plurality of items are arranged or stacked in a longitudinal array with their primary and complementary code profiles adjacent and in alignment. A primary displacement means is positioned in transverse relationship to each item, and consequently longitudinally to the stack, to sense the successive code bits of the coded primary profile by engaging and displacing in turn the ridges (or tabs) of the items. A second identical displacement means is operatively positioned in a like manner in respect to the stack but adjacent the complementary code profiles.

The desired coded item is retrieved by operating the displacement means according to the item's coded designation. Each bit of the code is searched simultaneously in all items by operaitng the primary means for a binery ONE bit, or the complementary means for a binary ZERO bit. By this method the primary displacement means operates positively only in respect to those items in the store having a bit of the binary ONE designation; it has already been noted that in the primary code segment binary ONE was the presence of something, such as a ridge. Thus, the primary displacement means acts positively to sense that which has a physical existence when binary ONE of the code is searched. When a ZERO bit appears in the binary designation this is indicated by an absence in the primary code profile, but a presence of the ridge or tab on the complementary profile. The method of the invention, therefore, requires operating the complementary means which performs a positive selecting action on all items having a ZERO adjacent thereto, binary ZERO on the complementary profile of the code being indicated by something which the means can displace.

Each successive operation of the two displacement means in relation to the ZERO'S or ONE'S of the binary access code of the desired item displaces part of the plurality of items including the desired one. After all of the bits of the code have been worked only the item which was displaced by every operation, i.e. the desired item, will protrude from the stack further than any other.

An important feature of the invention is that all the cards in the store are, in effect, searched simultaneously rather than sequentially; the logarithmic reduction of a plurality of items to the one desired is an obviously powerful method.

An additional feature of the invention is that the operation is wholly positive. By this it is meant that the active bar, either primary or complementary, engages and abuts the tabs of the cards having tabs at that point and displaces them laterally. The other bar, although passive, is in a position to operate positively on tabs of all the cards which are not displaced by the active lever, withholding the undisplaced cards which might otherwise be pulled along by friction of an adjacent card.

Another feature of the invention is that the operation of the apparatus is not a critical function of card size or weight. The retrieval apparatus may be wholly manual, semi-automatic, or fully automatic requiring only selecting a desired code number from an accession keyboard. In any case, such apparatus is considerably less complex and less expensive than much slower devices.

A further feature of the invention is that the adaptability of the device permits use of either standard size cards or any unique size. Moreover, it is entirely feasible to code conventional, sequentially scanned cards in the manner described.

A still further feature of the invention is that the coding may be done by ordinary clerical personnel using simple scissors; and the code can be confirmed by visual observation. Any of the binary variant codes may be employed and while redundancy is always a characteristic with variants, the expense herein is simply the cost of having a few extra tabs.

Still other features of the invention will become apparent from the more detailed description which follows wherein:

FIG. 1 is a face view of a data bearing card prior to being coded;

FIG. 2 is a face view of the same card shown in FIG. 1 after certain tabs have been removed for identification coding, with a pair of primary and complementary displacement bars shown in their passive positions;

FIG. 3 is a diagrammatic perspective view of a plurality of uniquely coded but physically similar cards arranged in an aligned stack in a retrieval apparatus prior to operation thereof;

FIG. 4 is the same view after the apparatus has been operated to retrieve a certain predetermined card;

FIGURES 7A-7F illustrate successive operations in retrieval of cards from the library of FIG. 6, and FIGS. 8A-8F are different views illustrating the same sequence of operations as FIGS. 7A-7F, with the same letters employed in the two sets of figures to designate identical operations in the sequence;

Figure 9A:
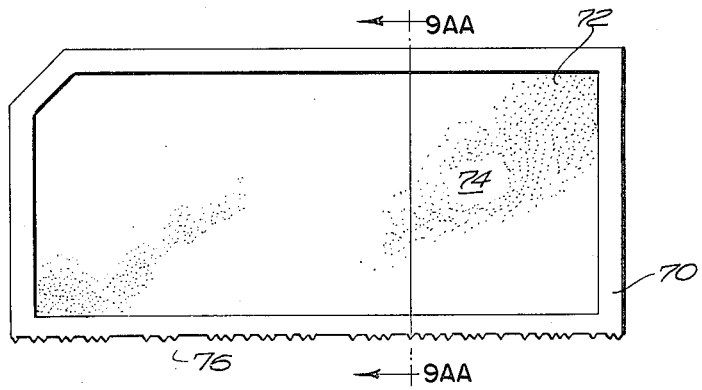
Figure 9A:
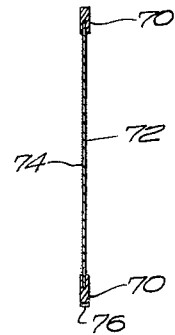
Figure 9B:
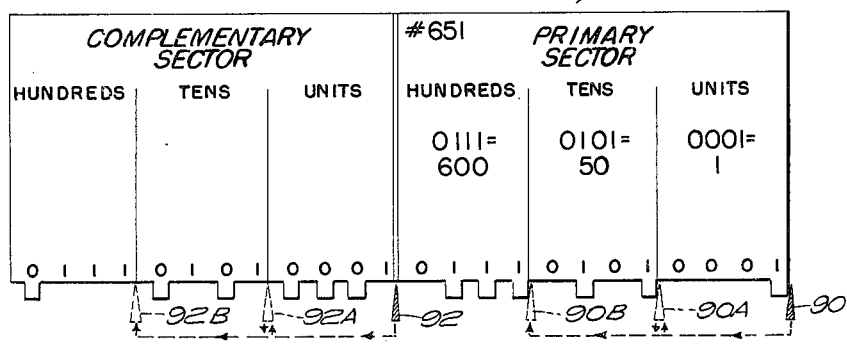
Figure 9C:
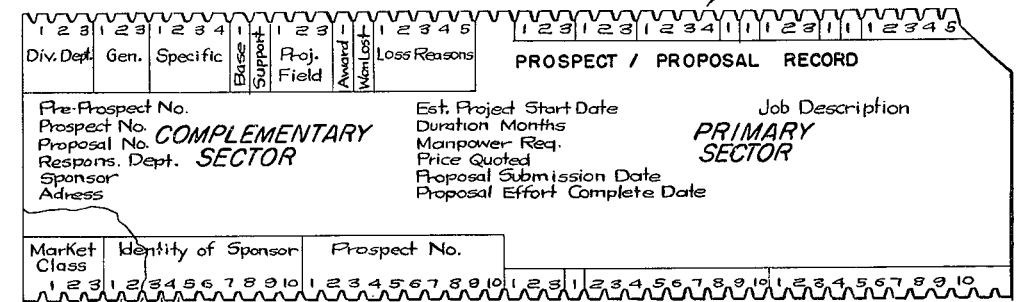
Figure 9C:
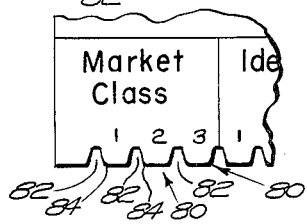
Figure 10A:
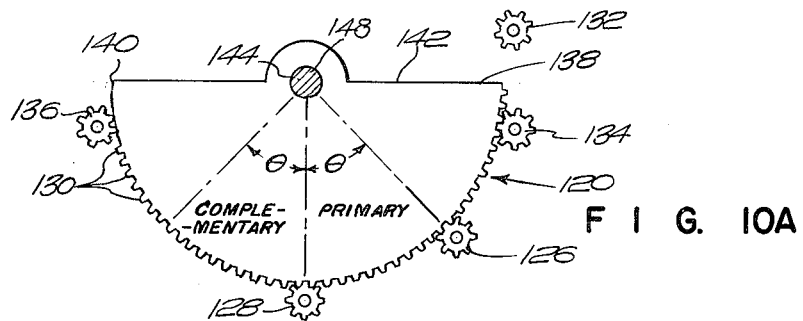
Figure 10B:
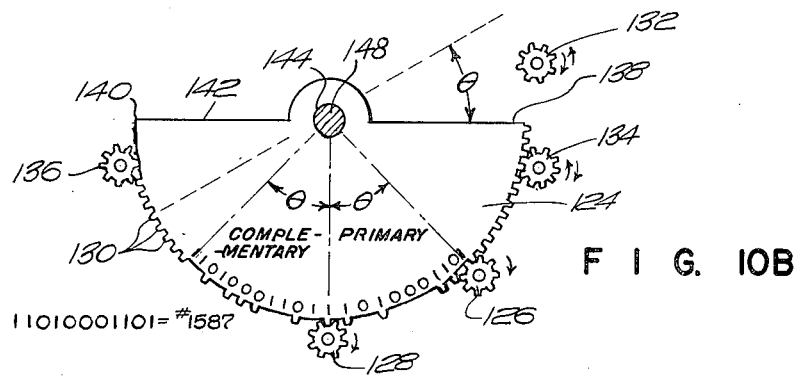
Figure 10C:
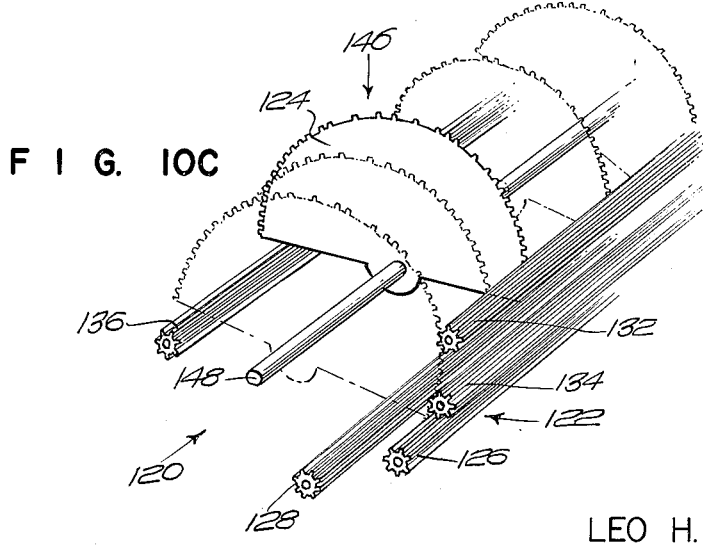

FIGS. 9A and 9AA show a framed card having a magnetic surface for information storage;

FIG. 9B illustrates a card having a plurality of discrete code segments;

FIG. 9C demonstrates how a card having a plurality of discrete segments can be utilized in a special application;

FIG. 9CC illustrates a preferred code tab design;

FIGS. 10A-10C illustrate how the invention may be applied to information bearing sheets of unconventional shape;

FIGS. 11A-11D show an embodiment of the invention applied to materials' handling.

In the accomplishment of the objects of the invention, in this embodiment each one of a plurality of data-carrying sheets such as standard index cards has a profile comprising evenly spaced tabs and notches along an edge thereof. This card with its evenly spaced tabs is the uncoded basic unit upon which data and information are stored. The distance between the centers of adjacent tabs is the pitch distance and will determine how far the cards are displaced on each cycle. The coding for a unit card is performed by cutting out certain predetermined tabs from the evenly spaced array of tabs and notches on the one edge to form a unique, coded profile. One half of the coded edge is given the primary code; the other half is given the complementary code. A plurality of these distinctly coded but physically similar cards are then stacked and aligned with their coded edges adjacent in a retrieval mechanism which has means arranged to selectively engage corresponding tabs of all the cards simultaneously.

According to the method of this invention, cards are differentially displaced laterally from the stack. A displacement bar or push-rod is arranged to engage only the notches in the primary code profile, pushing at the adjacent tabs to displace cards having tabs at that spot and not others. A second bar is identical but co-acts with the complementary code profile. The primary bar is actuated for binary ONE in the code, the complementary bar for binary ZERO in the code. After a number of engaging operations equal to one-half the total number of tabs of the uncoded unit card, the desired card will have been displaced from the stack more than any other card and may thus be distinguished from the remainder of the plurality of cards in the library store.

More specifically, a basic uncoded unit card will have twice as many evenly spaced tabs or teeth notched out of an edge as the exponent $n$ (where $n$ is an integer) of the base 2 which causes the expression $2^n$ to be equal to, or greater than, the total of cards in the store. The unique access code for a particular card is a function of the pattern of tabs which remain after certain tabs are removed in the encoding process.

In the preferred embodiment described herein, the edge of the card having the tabs is actually divided in half, $n$ teeth on one half, and $n$ teeth on the other half. This permtis the creation of a profile pattern on one side which is the complement of the other side. Thus, the presence of a tab on one side, which, for example, may be taken to represent binary ONE, will be "complemented" by the absence of a tab at the corresponding position on the other side.

Accordingly, a store of 15,000 cards requires that $2^n \geq 15,000$; $n$ must therefore be at least 14, as $2^{14} = 16,584$. Each side of an uncoded card in this store would have fourteen tabs. A card with decimal number 173, for example, would have a binary number of 001 000 1101. If on the primary side a binary ONE is represented by the presence of a tab, binary ZERO is its absence. From the extreme right of the card, tabs on the primary side corresponding to binary ZERO of the code designation would be removed. Precisely the opposite obtains on the negative half; the binary ONE tabs are cut out, the binary ZERO tabs remain.

The whole store of physically identical but differently encoded cards is arranged as a stack with the primary and complementary tab edges adjacent and placed within the filing apparatus; the two halves of the cards which have been called primary and complementary halves each have a primary and complementary engaging bar or lever respectively which is disposed longitudinally with respect to the stack. These bars are arranged to move laterally when a tab or tooth forming part of the profile on any card is engaged. The bars are moved as a function of the binary designation of the desired card; the primary lever for a ONE, the complementary lever for a ZERO. But the non-operative bar also has an extremely important function; it will always engage tabs on any cards which are not positively moved by the active, operative bar. In other words, the passive displacement bar effects a positive withholding force on all the cards which should not move but might because of friction.

If there is a full store of cards sequentially coded in the simple binary form, half of the store will be displaced with each lateral movement of either of the bars. This successive division by a factor of 2 of each remaining halves give the system its logarithmic characteristic. Since a displacement bar is actuated for each bit of the identity code, retrieval requires as many operations as there are bits. It takes only twenty mechanical operations to select a desired card from a million cards (approximately $2^{20}$) as compared with the ten operations for retrieval from a thousand cards (approximately $2^{10}$). Estimating that each displacement operation can be performed in 1/10 second, it would take about one second to isolate a preselected card out of a store of 100 cards, and it would theoretically take only 2 seconds to search a store having a million cards. These times are significant when it is known that the very best search rate of I.B.M. punched cards, for example, is only a few hundred cards per minute, requiring a few days for a search through a million cards in comparison with a few seconds.

Referring now to FIGS. 1–4 generally, there will be seen a simple but illustrative device 14 embodying the principles of the invention. A whole system comprises a file box or magazine 16 with displacement bars 18 and 20 operatively positioned in slots 19 and 21 respectively to co-act with a store of information sheets 22. Slots 19 and 21 are parallel slots formed in the bottom of magazine 16. In this device a data-bearing sheet such as a library catalogue card 22 shown in FIG. 1 is provided with evenly spaced tabs 24 and notches 26 on an edge 28. The original number of tabs 24 is directly related to the total number of cards 22 in any particular card store. It will become evident as the description proceeds that the total number of tabs for each basic, uncoded data sheet, such as the tabs 24 on the card 22, may be found first by raising the base 2 by a whole exponent $n(2^n)$ which yields a number equal to or greater than the anticipated storage capacity of a particular application. For example, if the application requires a store of 1000 cards 22, the exponent $n$ of the expression $2^n$ will be 10 as $2^{10}=1054$. The second step for calculating the total number of tabs 24 for a basic uncoded card 22, is to multiply the exponent by 2; in this case 2 x 10 indicates that the total number of tabs 24 must be twenty.

If a store or library of 1,000,000 data sheets is to be dealt with according to the principles of this invention, the exponent $n$ required to make the expression $$2^n = 1,000,000$$

or more is $n=20$ ($2^{20}=1,048,476$). The total number of tabs on an uncoded data sheet required for retrieval from a 1,000,000 unit file is thus forty, only twice the number required for a file handling 1000 units.

In considering the essential characteristics of this invention, it is more useful to consider these tabs 24 from a different point of view than as a simple aggregate. On an uncoded card 22, tabs equal in number to the exponent $n$ form a profile on only one-half the tab bearing edge 28; the same number of tabs, viz. $n$, form a profile on the other half. For purposes of this invention, the tabs 24 at the right of the centerline 30 of the card 22 indicated in FIG. 1 will be considered to be on a primary sector or field 32, the tabs at the left of the centerline will be considered as on a complementary sector 34.

The coding operation is performed on each side of the card 22 by creating a unique pattern of tabs and "no-tabs" corresponding to the binary designation for that card. On the side 32, termed primary, the presence of a tab 24 is representative of binary ONE, and the absence of a tab representative of binary ZERO. A complementary pattern of tabs is created on the complementary side 34. Thus, the presence of tabs 24 on the complementary side 34 will be taken to represent binary ZERO, their absence to represent binary ONE. Looking at FIG. 2, the pattern of that card has been created to represent the binary number 101 000 1101 which in simple binary notation will be equivalent to decimal 653. Since there are ten tabs 24 available for an accession code the binary range is from 000 000 0000 to 111 111 1111 which permits an aggregate of 1024 differently coded cards 22.

Commercially, data sheets such as the cards 22 can be supplied uncoded to the user with a complete set of tabs 24, the user arranging his own code. For standard applications, such as records of a small company, a small library or certain common cataloging situations, the cards 22 can be precoded. Another alternative would be to supply the card 22 without the tabs 24.

Figure 5:
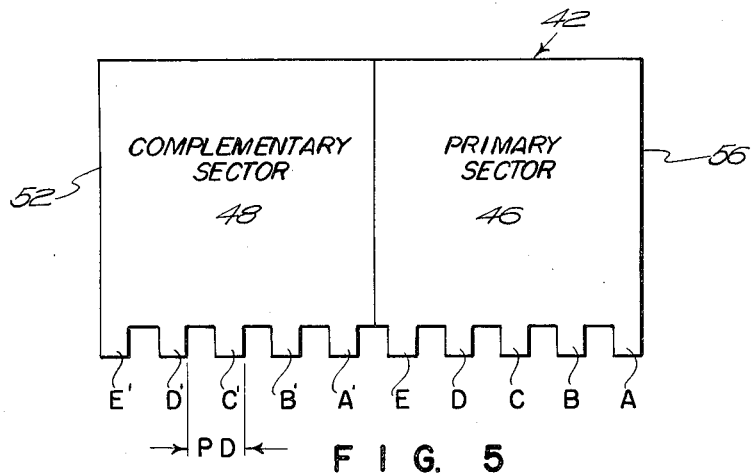
FIG. 5 shows an uncoded data card of a second type which is suitable for a thirty-two card capacity library.

The functioning of the retrieval method may now be described with reference to FIGS. 5–8F. In order to clarify the explanation without sacrificing either precision or thoroughness, a file 40 of thirty-two data sheets 42 will be considered. As indicated in FIG. 5, the basic data sheet 42 is a card having five primary tabs designated A–E and five complementary tabs designated A'–E'. A retrieval apparatus 44 similar to the device 14 that is shown in FIG. 3 is illustrated in the perspective view of FIG. 6. Four of the thirty-two cards 42 in the file 40 have been emphasized to indicate how each fares during the retrieval cycle; to attempt to describe the status of every card in the file at each point in the access cycle would unduly obscure the principle involved and would defeat simple explanation. The four particular cards 42 will be designated throughout the succeeding operating description by reference to their assumed decimal identification numbers, No. 1, No. 15, No. 22, and No. 32. To avoid confusion with reference numerals they will appear in brackets thus (15). When it is necessary to define a particular portion or aspect of one of these numbered cards, the card's bracketed decimal designation will precede the reference number.

The desired card from file 40 is (22) and the sequence for selecting it is shown in FIGS. 7A–7F and 8A–8F. FIGS. 7A–7F and FIGS. 8A–8F constitute two different ways of illustrating the same steps in the sequence for selecting a desired card from file 40. Thus, FIGS. 7A and 8A correspond, FIGS. 7B and 8B correspond, and so forth.

Figure 6:
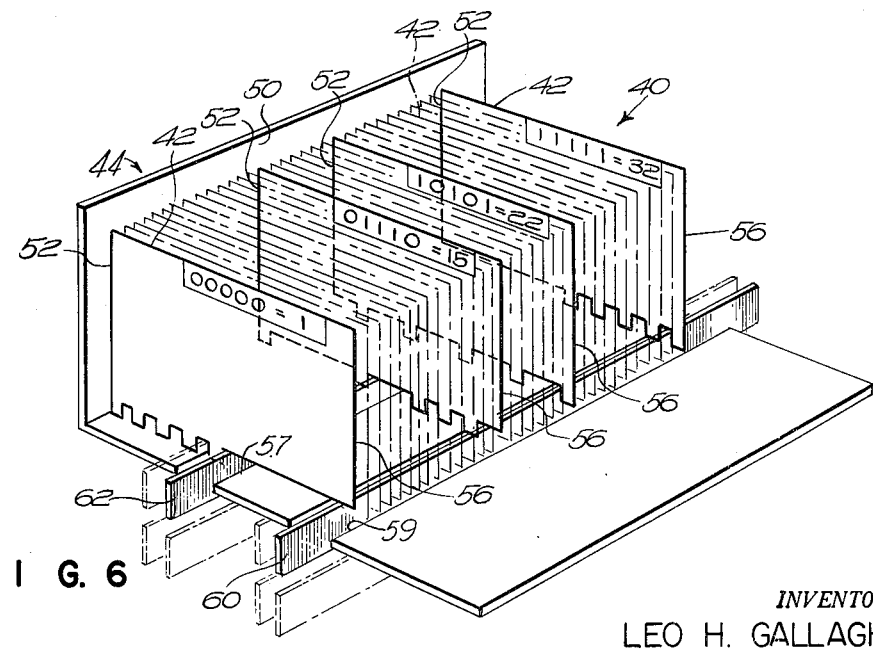
FIG. 6 is a partially cutaway perspective view of the thirty-two card library with certain cards emphasized.
Figure 8F:
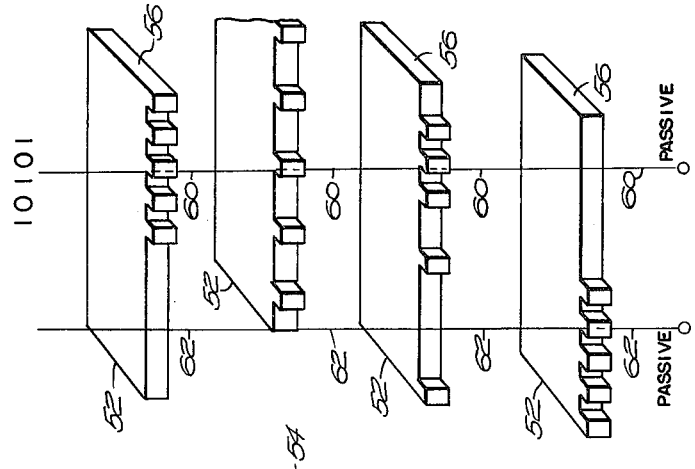
Figure 8E:
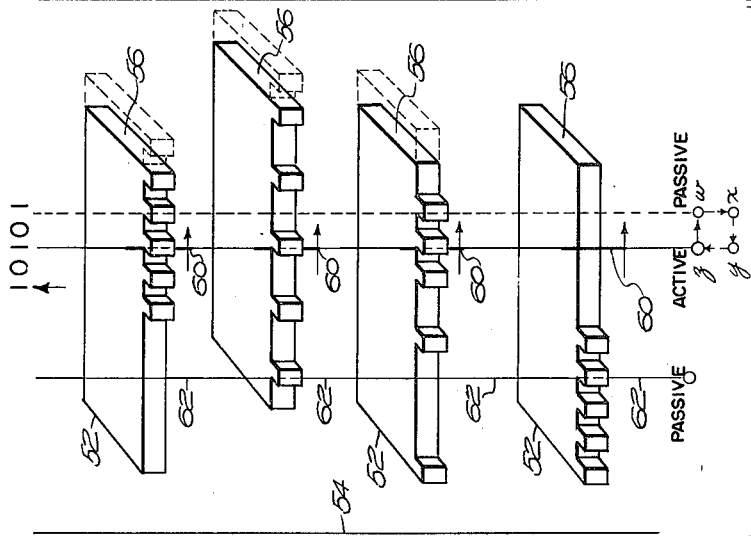
Figure 8D:
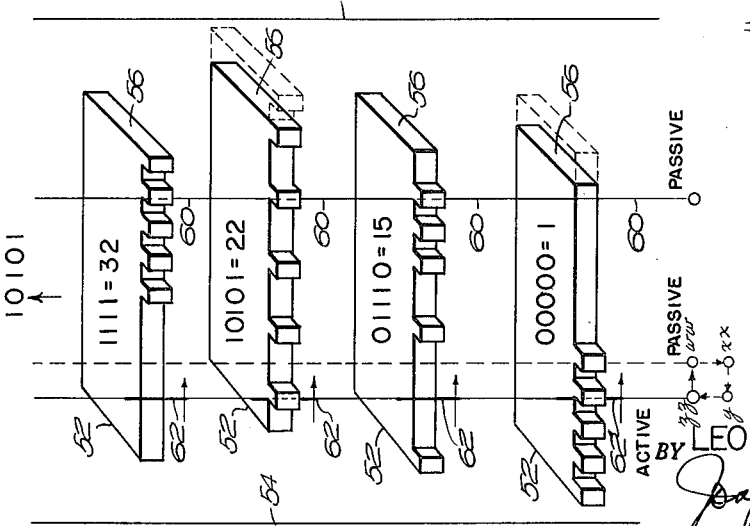

In the sequence figures, it will be seen that the four cards carry decimal numbers (1), (15), (22) and (32) and have, as indicated on each card, a respective binary number equivalent; the tabs A–E and A'–E' on the cards have been arranged in a pattern corresponding to the cards' binary designations in the manner explained previously. All the cards 42 in the store 40 are stacked in the retrieval apparatus 44 as shown in FIG. 6, with primary and complementary code sectors 46 and 48 being aligned. The left wall 50 of the apparatus 44, which serves to align the left edges 52 of cards 42, is represented in the sequence FIGS. 7 and 8 by a heavy vertical position reference line 54 appearing in all the sequence figures; since the cards 42 are physically identical the right edges 56 of all the cards 42 are also aligned and this initial alignment plane is represented by a light line 58 in all the sequences. A primary displacement bar 60 which is disposed in a bottom wall slot 57 longitudinal to the aligned stack 40 has a normal, passive position $w$ which is immediately to the right of the primary sector 46 but adjacent to the card edges 56 on the line 58. A complementary displacement bar 62 is disposed in a second bottom wall slot 59 which extends parallel to slot 57 longitudinal to the stack 40 of cards 42. Bar 62 is initially located in its passive position $ww$ immediately to the right of but adjacent to the complementary code segment 48.

In each of the sequence FIGURES 7A–7F and 8A–8F, the action of the operative displacement bar is shown by motion diagrams positioned in respect to the corresponding bar. As will be noted in any of the diagrams, the operative displacement bar moves downwardly from its rest or passive position at $w$ to $x$ position, enough to clear the adjacent tabs, moves laterally through the distance from $x$ to $y$ and upwards into an active tab-abutting position at position $z$. Its "active" motion is lateral as indicated by the solid arrow in the figures, from $z$ to $w$, left to right in this embodiment, traveling through the pitch distance and stopping at its passive, rest position at $w$. It is, of course, a simple matter of convenience and convention as to which way the displacement bars 60 and 62 are caused to move. In this embodiment, the binary code is read from right to left, the bars 60 and 62 displace the cards 42 from left to right. The slots 57 and 59 limit the transverse displacement of bars 60 and 62 respectively from position $z$ to position $w$ to the pitch distance of the uncoded card (see FIG. 5).

The operation of displacement bars 60 and 62 is in accordance with the sequence of the binary code 10101 for the desired card, (22). Reading the binary accession code of the desired card (22) from right to left, since the first bit is ONE the primary bar 60 is operated; the second bit being 0, the complementary bar 62 is operated, the third digit being ONE, the primary bar is operated. If all the binary digits of a desired card were ONE'S such as number (32), the primary bar 60 would be operated five successive times. In precisely the same manner, the card having decimal number (1) which is represented by binary 00000 is isolated by successively operating the complementary bar 62 five times in succession.

Referring now to FIGS. 7A and 8A specifically, the first operation is in respect to the binary ONE which occupies the least significant position in the code of the desired card; the motion of the primary bar 60 is indicated by the lateral arrows; the bar engages the A tabs on card (32) and card (22).

The lateral movement of the bar 60 from $z$ to $w$ thus urges cards (32) and (22) through the pitch distance. It can readily be seen that the complementary bar 62, in its passive or rest position at $ww$ exerts a positive withholding effect by abutting the binary tabs A′ on cards (1) and (15) which are not positively displaced by the movement of the primary bar 60.

The second binary digit of the code 10101 being ZERO indicates a complementary tab for that bit and requires actuating the complementary bar 62 as shown in FIGS. 8B and 9B; the four cards are outlined by solid lines after the previous operation of the primary bar 60 which displaced cards (32) and (22). The bar movement diagrams illustrate the action of the complementary bar 62 from its passive position of $ww$. The bar 62 engages the B′ tab on card (22) and the A′ tabs on cards (1) and (15), and moves from position $zz$ to $ww$ through the pitch distance carrying these cards; the dotted outlines show the new positions of the three cards (22), (1) and (15) after the complementary bar 62 has completed its cycle. It may again be noted that card (32) not having any tab engaged by the moving complementary bar 62 is nonetheless positively withheld by the action of the B tab in the primary sector abutting the primary bar 60 which is in its passive position at $w$.

The next operation is in respect to the third binary digit from the right of the access code, in this case binary ONE again. FIGS. 7C and 8C show that operation of the primary bar 60 engages the C tab on card (22), the B tab on cards (32) and (15). Thus, while all of the cards have been displaced in the first three operations, only the desired card (22) has been acted upon at each of the preceding operations by one of the two displacement bars 60 and 62. As a consequence, card (22) is differentially displaced from all the remaining cards and will continue to be successively urged to the right until it is displaced more than any other card in the file 40.

The fourth and fifth events of the cycle illustrated in FIGS. 7D, 7E, and 8D, 8E are identical in principle with the first three described. In the terminal figures of the sequence, FIGS. 7F and 8F, it is evident that the desired result has been accomplished.

The diagrammatic illustration of FIG. 4 demonstrates how a preselected card will appear when retrieved, standing out from the plurality of cards in the stack. In a simple system this card may be readily distinguished and withdrawn by hand. In a more sophisticated device an automatic carriage mechanism may be employed which travels along the edge of the retrieval apparatus, which picks out the desired card and takes it to a viewer.

If the stack of data cards 40 just described was complete from card (1) through card (32), it would have been noted that out of the total of thirty-two cards, sixteen would be displaced on the first move, eight on the second, four on the third, two on the fourth and one card, the desired card (22) would be displaced on the fifth and last operation.

Another search through the card store 40 requires that the displaced stack be realigned again in the retrieval device 42 in the manner illustrated by FIG. 3. The displacement bars 60 and 62 must, of course, be lowered out of the way to avoid being engaged by the tabs during realignment.

The foregoing explanation of the principles of the invention in terms of a system which was presumed to have a total store of only thirty-two cards is precisely the same for a card library of any size. The unique virtue of the logarithmic retrieval technique outlined here is that a store of one thousand cards basically requires only that the number of coding tabs be doubled, from a total of ten on a card for the thirty-two card library, to the twenty tabs on the card illustrated in FIG. 1. Where five operations retrieve one card out of thirty-two, only ten operations give access to one card out of a thousand.

A library or store of a million items requires that each item have forty tabs and retrieval requires twenty operations.

It is now possible to turn to certain aspects of the invention which have not been treated while explaining its operation. Any data carrying entity such as the card 22 in FIGS. 1 and 2 or the cards 42 shown in FIGS. 5–8 must, of course, be adapted first to the requirements of the application. A library of information-bearing sheets having, for example, engineering drawings as the intelligence thereon will obviously not necessarily be the same size nor have the same access and coding requirements as a store of information-bearing sheets consisting of statistical data. Actually, in the first case the drawings might well be on units of photographic film; it would be possible to encode the film or other photosensitive surface directly, or the film could be mounted on a card bearing the appropriate access code.

One other variation in a data sheet which may be handled according to the principles of this invention is shown in FIGS. 9A and 9AA. A substantially rectangular frame 70 supports a material 72 having a magnetic storage surface 74 comparable, for example, to magnetic tape. Data may be stored on such a surface, sensed, erased and recorded as required. The electrical signals corresponding to the stored data can obviously serve a variety of applications. Access to the data on this "block" or card is provided by an external edge 76 of the frame 70 which is coded in the manner described previously.

The size of cards in a particular system will primarily turn on the requirements of the library; but a card must be large enough in relation to the total number of cards in the store to permit having $2n$ bits on the coded edge. A ten thousand card library requires a 13 bit code or a total of 26 bits in the primary and complementary code segments.

The examples of cards illustrated in FIGS. 1 and 5 were chosen with a view to assist in explanation of the elements of the invention. In practice, however, it is essential that the durability of the coded edge of the card be given close consideration. This will lead to a code tab design which will more likely correspond to a card 78 illustrated in FIGS. 9C and 9CC. Here the tabs generally designated at 80 are wider than the notches 82 between; the tab corners 84 are rounded as will be seen in the detail of FIG. 9CC and in extending from the edge 86, they taper slightly. Generally, tabs on a thin, paper data sheet must be stronger and larger than those on thicker paper or cardboard. Therefore, if a thin data sheet were made of a plastic, or a paper card were sandwiched between layers of thin plastic film, for example, the tab spacing and consequently the number of bits could be increased without necessarily increasing the dimension of the code-bearing edge.

The shape and size of the notches between the tabs will depend upon the nature and cross section of the displacement bars; and the design of the bars will in turn depend on (a) the number of cards in a given stack and (b) the mechanical apparatus employed to operate them.

The previous discussion has been exclusively in terms of displacement bars which are moved manually from a passive positive to an active position. For a small card store of 5000 cards, for example, manual operation is entirely feasible; for a larger library, automatic operation is desirable. While the description has focused on individual displacement bars, it is clear that the same displacement function can be provided by a variety of mechanical expedients. For example, a plurality of bars may be mounted radially on the outer cylindrical surface of a drum providing bars in either active or passive positions as required. Moreover, the drum can be driven by means such as a motor, responsive to manually selected signals or to a "program" provided through an associated accession device.

Another factor in the design of a system requires that the storage density of the cards also be considered. It is obviously desirable that a high packing density be achieved provided there is not an increase in deterioration, mechanical complexity or other sacrifices elsewhere in the system. A standard machine sorting card applicable for this invention is initially .005" in thickness, which gives a theoretical packing density of 200 cards per inch. This density is not in fact accomplished because of abrasion, bending and deformation of individual cards. A more realistic density would be about 100 cards per inch, or 1200 per foot.

It is mechanically feasible to consider searching a stack five feet long which permits a conservative storage capacity of 5000 cards of about the same size and thickness as conventional, serial sorting IBM-type cards. Such a search unit including card library and retrieval means may be integrated with other similar units to multiply the store capacity accordingly. A single accession device may be employed to control a multitude of stacked units simultaneously. It should be pointed out that the theoretical relative speed of retrieval which is a factor of 2 for a million-card library as compared to a thousand-card library will not be realized in practice because the latter may require only a linear foot of space, whereas a million-card library would require a single thousand foot long file and create evident mechanical involvement. However, the virtues of the invention are not to be weighed by comparing theoretical access speed with the access speed of mechanically feasible embodiments. Searching a 25,000 card collection of randomly stored IBM cards by the usual sequential method requires a period of time which is in the order of one hour. Five desk-length units of the present invention, having a 5000 card capacity in each unit and operated simultaneously by a single accession device would require about a quarter of a minute assuming a fifteen bit code and a conservative second for each of the fifteen displacement cycles required.

Another technique of handling a library of 25,000 items involves a number of magazines each holding, for example, 1000 or 2000 cards. These cards magazines are brought to a retrieval apparatus consisting of displacement means and an accession device. Each magazine is placed in turn in operative relation with the retrieval apparatus, the file in the card magazine is scanned, the desired card or cards are removed if present, and then the magazine is taken off to make way for the next one. The search time for a fifteen bit code is no more than fifteen seconds regardless of magazine size; removing one magazine and replacing the next need not take more than 15 seconds even if performed manually. Assuming the smallest magazine, e.g., about 1 foot long holding 1000 cards, twenty-five of such magazines would have to be searched, requiring 30 seconds for each or a total of less than 13 minutes for the whole library of 25,000 cards. This time of 13 minutes compares favorably with the hour's time required for the sequential comparison by the fastest IBM devices.

Up to this point the description of the invention has been in terms of data sheets having simple binary coding of single primary and complementary code sectors. It should be emphasized that the code form need not be limited to a simple binary arrangement but may encompass a decimal-binary, alpha-numeric binary or any other binary variant. In fact, in a number of applications of this embodiment, a decimal-binary code would have decided advantages. For example, where a number of cards have data which is most conveniently catalogued under hundreds or tens, a decimal binary code permits access to all the cards within the numeric category simultaneously.

As is well known, four binary bits are required for each designation of units or tens or hundreds. Such a twelve bit (4+4+4) code permits access, for example, to all the cards in the 30's, or all the cards in the 600's and also to any one particular card. A decimal-binary coded card 88 would have three primary code segments and three corresponding complementary code segments as shown in FIG. 9B. This particular card is decimal number 651.

In order to retrieve a related numerical group of cards, such as all the 30's, the displacement bars 90 and 92 in FIG. 9B would have to be properly aligned to co-act with the tens code segments as shown in phantom at 90A and 92A. To retrieve all the cards 88 in the decimal 30's, its binary code equivalent would be 0011 (if decimal 10 is binary 0001, decimal 20 is binary 0010). Operating the primary bar 90 twice in succession, and then the complementary bar 92 twice will thus retrieve all the 30's.

Now, if all the 600's are wanted, the displacement bars 90 and 92 must be positioned to co-act with the hundreds code segment. This requires that the same two displacement bars 90 and 92 either be capable of now moving to the hundreds sector as indicated at 90B and 92B or that there be a separate pair of bars for each sector, three pairs of bars for this card. Clearly, the choice of movable bars or multiple pairs is a matter of engineering decision as to factors such as convenience, cost and simplicity.

However, a fixed set of displacement bars may be employed to effect the identical result as accomplished by multiple pair or a movable pair. Assume that the bars 90 and 92 are normally located as shown in FIG. 9B adjacent to the units sectors. If all the cards in the 30's are wanted, a simple technique is available for positioning all the cards to put the tens sectors in operative relation with the bars 90 and 92. Moving both the primary and complementary bars 90 and 92 simultaneously four times moves the whole stack of cards 88 over simultaneously and in alignment so that the bars are ready to retrieve the 30's cards.

Of course, the example just described is only one of many possible permutations of which the invention is capable. The well known drawback of most binary variant codes is redundancy. For a classification in the three categories of units, tens and hundreds, each category requires a code sector on the card; the ten elements of each category require a four bit code which is capable of 16 combinations thereby causing redundancy of 6 combinations. While redundancy is to be avoided, in some applications it is useful to have available the redundant combinations for encoding, for example, alphabetic-decimal access designations.

The data sheet 78 shown in FIG. 9C, already noted for the configuration of its tabs 80, is particularly interesting for two other reasons. First, it illustrates one possible application of the multi-code segments mentioned previously in connection with the card 88 illustrated in FIG. 9B. In this multi-sector card 78, the different sectors have larger and smaller binary acess permutations available; sector 102 "Identity of Sponsor" can have $2^{10}$ different entries, sector 104 labeled "Loss Reasons" permits $2^5$ possible entries. Secondly, it will be noted that both the bottom edge 106 and top edge 108 have been utilized for indexing, substantially doubling the identity data in the access code designation for a given card length.

It is clear that the inventive concept need not be confined to essentially rectangular data-bearing sheets such as those shown in FIGS. 1, 5, and 12. For example, FIGS. 10A–10C illustrate a data bearing card 120 which is partially circular and retrieval apparatus 122 for use in conjunction therewith.

Basically, the rationale of retrieving an information sheet having an arcuate code profile such as this partially circular card 120 is identical with that for the linear code profile of the rectangular items already explained in detail previously; a number of comments on some distinctions are in order, however. FIG. 10A shows a basic uncoded, partially-circular data sheet or card 120; only about 90° of the circumference is utilized for access coding purposes, however.

In this embodiment, the angle $\theta$ is the useful angular sector for the primary and complementary codes and is equal to about 45°. FIG. 10B shows a particular coded card 124 having an access designation of 11010001101 which in simple binary is equivalent to decimal number 1587.

The displacement means for this embodiment will function in a comparable manner to the displacement bars 60 and 62 of FIG. 6, except here the displacement is accomplished by geartype bars 126 and 128 for the primary and complementary code profile sectors respectively; these gear bars being disposed to engage the gear-type teeth 130 on the data cards. Three other gear-type driving bars 132, 134, and 136 are mounted near each end 138 and 140 of the line 142; their function will become clear when the operation is explained.

A plurality of uniquely coded but physically similar data cards 120 each having a centered mounting aperture 144 are aligned in a stacked array 146 on a common shaft 148 and are free to turn thereon. The displacement bars 126 and 128 are operated in accordance with the access code of the desired card 124 to differentially, angularly displace all the cards 120 in the array 146, the desired card being displaced the furthest at the culmination of the sequence of the retrieval operation. The desired card 124 will be displaced counter-clockwise by an angle equal to $\theta$, in this case 45°. All the other cards 120 will, of course, be displaced by an angle less than 45°.

Now the driving gears 132 and 134 may be engaged to simultaneously angularly displace the selected card 124 and all the others 120 further counter-clockwise until the desired card is displaced 180° or slightly greater from its original position in the aligned array in file 146 to engage with gear 136. The gears 132 and 134 are spaced apart so that one will always engage a tooth 130, and they are so located that the lower gear 134 does not engage any card which is displaced 180° or more from its original position.

Since the desired card 124 was the furthest displaced prior to operation of the driving gears 132 and 134, all the other cards 120 are displaced less than 180° and are engaged by driving gear 134 but not by gear 136. Having gears 132 and 134 turn in the opposite direction will cause all the cards 120 except the predetermined card 124 (now engaged by gear 136) to be driven clockwise back into the file 146. Realignment is accomplished by simply operating the code bars 126 and 128 in reverse order and in the opposite direction.

The information on card 124 can be read off directly, or in a more sophisticated system a moving carriage (not shown) for television scanning, integrated with the retrieval apparatus 122, may be employed for display and readout.

After the information has been used, the card 124 can be returned by engaging drive gear 136 which is so placed to be capable of engaging any card which is at substantially 180° with reference to its original position in the file. Once the retrieved card 124 is returned to the file 146 and aligned with the plurality arranged therein, the next retrieval operation may be commenced.

The various embodiments of the invention discussed so far have dealt with data-bearing entities which were substantially two dimensional and could be properly called sheets or cards. Clearly, the invention need not be confined to paper or cardboard sheets as the thickness of the item is not critical to the invention's operation. Data-bearing entities could well have substantial thickness such as glass slides with a frame bearing the profile of the access code; metal or plastic units may also be successfully stacked and retrieved in accordance with the method described.

A departure from two dimensional sheets which is of particular interest deserves a brief explanation. In FIGS. 11A through 11D there is illustrated apparatus at 150 for retrieval of a single, preselected, material filled bin 152A out of a large multitude of similar bins 152. In huge warehouses where inventories of large quantities of small items are stored, an arrangement permitting immediate access from items filed and located at random becomes an attractive application of the inventive concept.

In accordance with the principles of this invention, it would be theoretically possible to place a series of primary and complementary ridges arranged in unique profile patterns at the bottoms of bins, place them in an aligned longitudinal array in operating relationship with the appropriate displacement bars and proceed as explained previously. But the weight problem of moving half of a large multitude of relatively heavy bins is obviously impractical. The system to be described avoids this problem. Basically, the apparatus 150 comprises a plurality of physically similar but uniquely coded pallets 154, displacement means for the pallets such as the bars 156 and 158, and the bins 152, one for each pallet.

Figure 11A:
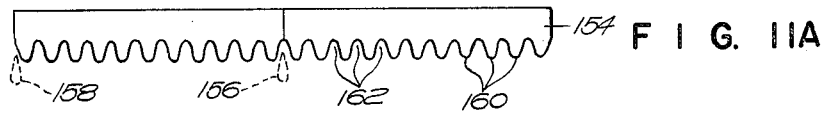
Figure 11A:
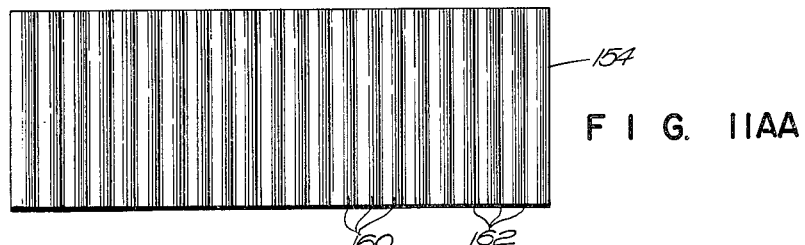
Figure 11B:
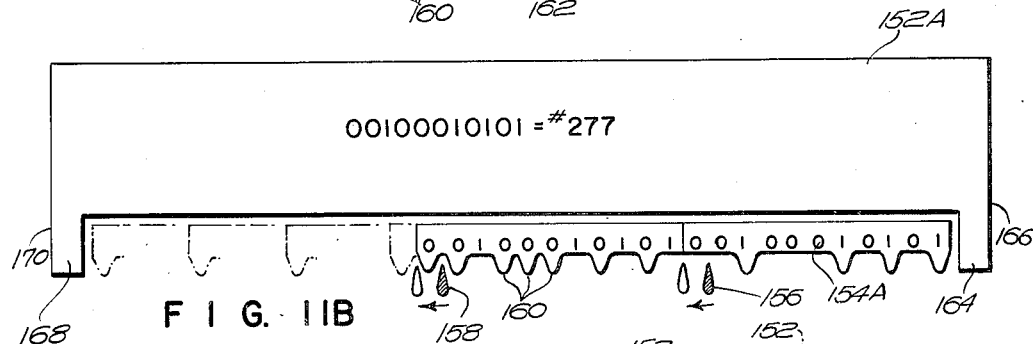

FIG. 11A shows an uncoded pallet 154 having a profile comprising a number of symmetrically spaced ridges 160 and grooves 162 which correspond to the tabs and notches of the data sheets already described. A unique access code for a particular pallet 154A changes the profile of ridges 160 as shown in FIG. 11B. As noted previously in respect to data sheets each primary code profile has a complementary code profile; on the primary side a ridge 160 represents binary ONE and its absence binary ZERO, the situation is reversed on the other side, where a ridge represents ZERO, its absence ONE.

Figure 11C:
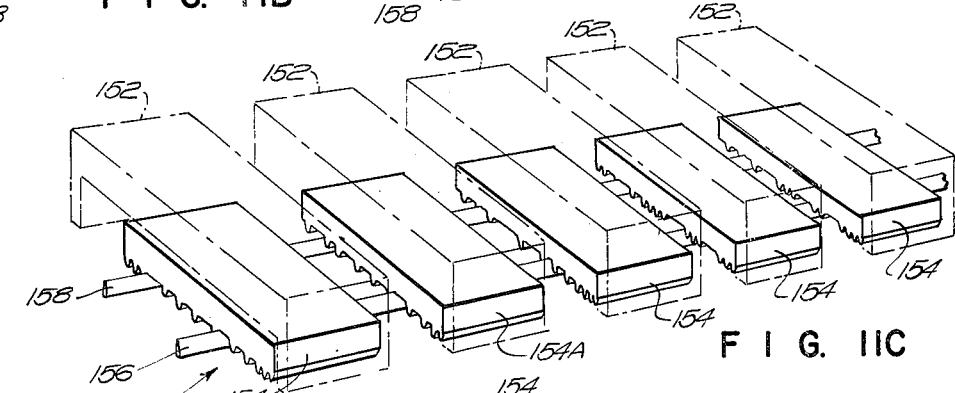
Figure 11D:
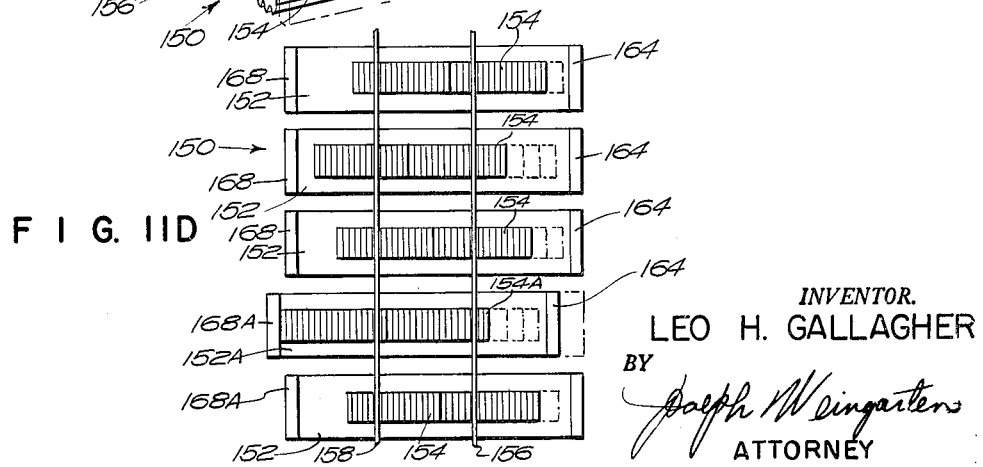

Each pallet 154 has a bin 152 above, the pallets being differentially displaced according to the method of this invention. It can be seen in FIG. 11B that a pallet 154A may move from its initial, aligned location under the bin 152 near a leg 164 on one side 166, to its furthest displacement locating abutting a leg 168 at the other side 170 of the bin. Just as the data cards 42 of the sequences represented in FIGS. 7 and 8 are first aligned in a stacked longitudinal array, the pallets 154 and their resepctive bins 152 are similarly aligned as shown in FIG. 11C. The displacement bars 156 and 158 are actuated in terms of the code of the predetermined bin 152A, displacing the pallets 154 accordingly. As shown in FIG. 11D, the one pallet 154A, however, will be displaced far enough beneath the bins 152 to abut and thus move its bin 152A to accomplish the desired result.

Still other variations of this preferred embodiment will occur to those skilled in the art; and, therefore, it is not intended to confine the invention to the precise forms and particular embodiments shown herein, but rather to limit it in terms of the appended claims.

What is claimed is:

In a method for retrieving a desired data bearing card from a plurality of similar data bearing cards randomly filed in a close packed stack, each of said data bearing cards having a median line to define a primary sector and an adjacent complementary sector, and each of said data bearing cards having an access pattern defined by the presence and absence of code tabs along at least one edge transverse to said median line, said access pattern being of a two character indentification code distinguishing each of said data bearing cards one from another and wherein the presence of one character in said primary sector is indicated by the presence of a code tab in said primary sector and is indicated in said complementary sector by the absence of a code tab in said complementary sector and the presence of the other character in said primary sector is indicated by the absence of a code tab in said primary sector and the presence of a code tab in said complementary sector said method comprising the steps of:

(a) aligning each median line in a plane of a longitudinal axis transverse to said stack so that the access patterns are disposed in a substantially common plane;

(b) arranging a first movable displacement means parallel to said longitudinal axis in a primary passive position which is adjacent said primary sector and in said plane of said access pattern and being located at a distance from said median line which is greater than the length of said primary portion of said access pattern;

(c) arranging a second movable displacement means parallel to said primary displacement means in a complementary passive position which is in the same plane as said access pattern and being located between said median line and said complementary portion of said access pattern; and (d) moving said first movable displacement means and said second movable displacement means in a sequence dictated by the indentification code of said desired data bearing card so that movement of said first movable displacement means is indicated by a code tab in said primary sector of said desired card and movement of said second movable displacement means is indicated by a code tab in said complementary sector of said desired card, the movement of each of said means in their respective sectors defining a path from said passive position thereof to an active position thereof wherein each of said means engages said code tab of said desired card and displaces said desired card as said means is moved to said passive position, thereby displacing at least the desired card from said stack each time said movable displacement means are moved through said path and continuing said movement of each displacement means until the desired card is retrieved.

References Cited by the Examiner

UNITED STATES PATENTS

| | | | |
|---|---|---|---|
| 999,991 | 8/1911 | Hargrave | 929—16.1 |
| 1,251,502 | 1/1918 | Gilfillan | 129—16.1 |
| 1,351,692 | 8/1920 | Soper | 129—16.1 |
| 1,382,004 | 6/1921 | Litchfield | 129—16.1 |
| 2,544,286 | 3/1951 | Block | 929—16.1 |
| 2,588,286 | 3/1952 | Perwolf | 929—16.1 |

FOREIGN PATENTS 1,122,146  5/1956  France.

JEROME SCHNALL, *Primary Examiner.*